(12) United States Patent
Chen (10) Patent No.: US 10,001,855 B2
(45) Date of Patent: Jun. 19, 2018

(54) TOUCH DISPLAY DEVICE AND METHOD FOR DRIVING THE SAME

(71) Applicants: HannStar Display(Nanjing) Corp., Nanjing (CN); HannStar Display Corporation, Taipei (TW)

(72) Inventor: Chien-Wu Chen, Kaohsiung (TW)

(73) Assignees: HannStar Display(Nanjing) Corp., Nanjing (CN); HannStar Display Corporation, Taipei (TW)

( * ) Notice: Subject to any disclaimer, the term of this patent is extended or adjusted under 35 U.S.C. 154(b) by 171 days.

(21) Appl. No.: 14/965,910

(22) Filed: Dec. 11, 2015

(65) Prior Publication Data
US 2016/0202819 A1    Jul. 14, 2016

(30) Foreign Application Priority Data

Jan. 9, 2015 (CN) .......................... 2015 1 0012603

(51) Int. Cl.
*G06F 3/041*  (2006.01)
*G06F 3/044*  (2006.01)
*G09G 3/36*   (2006.01)

(52) U.S. Cl.
CPC ............ *G06F 3/0412* (2013.01); *G06F 3/044* (2013.01); *G06F 3/0416* (2013.01); *G09G 3/36* (2013.01); *G09G 2310/08* (2013.01); *G09G 2330/021* (2013.01)

(58) Field of Classification Search
CPC ...... G06F 3/0412; G06F 3/0416; G06F 3/044; G09G 2310/08; G09G 2330/021; G09G 3/36
See application file for complete search history.

(56) References Cited

U.S. PATENT DOCUMENTS

| 2013/0082954 A1* | 4/2013 | Azumi ................... G06F 3/041 345/173 |
| 2014/0362042 A1* | 12/2014 | Noguchi ............... G06F 3/0412 345/174 |
| 2016/0188107 A1* | 6/2016 | Shepelev ............. G06F 3/0418 345/174 |

FOREIGN PATENT DOCUMENTS

| CN | 102906805 | 1/2013 |
| CN | 103970386 | 8/2014 |

OTHER PUBLICATIONS

"Office Action of China Counterpart Application", dated Mar. 30, 2018, p. 1-p. 6, in which the listed references were cited.

* cited by examiner

*Primary Examiner* — Viet Pham
(74) *Attorney, Agent, or Firm* — JCIPRNET (57) ABSTRACT

A touch display device and a method for driving the same are provided. The touch display device includes a display panel and a touch panel. In the method, the touch display device provides a source output signal and outputs a plurality of pixel voltages during an enable period of the source output signal to drive the display panel. The touch display device periodically reduces the enable period of the source output signal according to a horizontal synchronization signal corresponding to a turned-on sequence of each row of pixels, so as to establish a touch sensing period. Based thereon, the touch sensing circuit scans the touch panel during the touch sensing period that does not overlap with the enable period of the source output signal, so as to obtain sensing signals for accurately indicating electrical variations of the touch panel.

20 Claims, 5 Drawing Sheets

TOUCH DISPLAY DEVICE AND METHOD FOR DRIVING THE SAME

CROSS-REFERENCE TO RELATED APPLICATION

This application claims the priority benefit of Chinese patent application serial no. 201510012603.8, filed on Jan. 9, 2015. The entirety of the above-mentioned patent application is hereby incorporated by reference herein and made a part of the specification.

BACKGROUND OF THE INVENTION

Field of the Invention

The invention relates to a touch display driving technique, and more particularly to a touch display device that maintains touch sensing accuracy and sensitivity and display quality and a method for driving the same.

Description of Related Art

Due to the ability to provide users with more intuitive and convenient ways of manipulation, touch display devices gradually become mainstream and are extensively adopted in a variety of consumer electronic products in recent years. Among various types of touch display devices, a touch display device having a capacitive touch panel accompanied by a liquid crystal display panel (hereinafter referred to as a "capacitive touch display device") is used most extensively for having good properties such as sensitive response, accurate detection of touch points and small size.

The capacitive touch display device detects the position of the touch point by detecting a capacitance variation of a touch panel, and the capacitance variation on the touch panel is in turn influenced by coupling effects of a display panel. Therefore, if driving/detection is performed to the touch panel during a display period that data is written to the display panel, the detected touch data may be disturbed by pixel voltages and be inaccurate. However, if driving/sensing is performed to the touch panel only during a blank period that no data is written to the display screen, the touch sensing frequency will be limited to the refresh frequency/frame per second (FPS), which causes reduction in touch sensitivity. Therefore, the design and arrangement of a driving sequence between the display panel and the touch panel is rather important.

SUMMARY OF THE INVENTION

A touch display device and a method for driving the same are provided, which enhance touch sensing sensibility without affecting touch sensing accuracy and display quality.

The method for driving the touch display device includes the following steps: providing a source output signal; outputting a variety of pixel voltages to drive a display device during an enable period of the source output signal; establishing a touch sensing period according to a horizontal synchronization signal and the enable period of the source output signal; and providing a plurality of scan signals during the touch sensing period according to the horizontal synchronization signal, so as to obtain electrical variations in the touch panel.

The touch display device of the invention includes a touch display panel, a display driving circuit and a touch sensing circuit. The touch display panel includes a plurality of pixels and a plurality of sensing units arranged in an array. The display driving circuit is coupled to the touch display panel for outputting a plurality of pixel voltages to drive the plurality of pixels. The touch sensing circuit is coupled to the touch display panel and the display driving circuit for driving the plurality of sensing units. The display driving circuit establishes a touch sensing period according to a horizontal synchronization signal and an outputting period of the pixel voltages. The touch sensing circuit provides a plurality of scan signals during the touch sensing period according to the horizontal synchronization signal, so as to obtain electrical variations of the plurality of sensing units.

The touch display device of the invention includes a display panel, a touch panel, a display driving circuit and a touch sensing circuit. The display panel includes a plurality of pixels arranged in an array. The touch panel includes a plurality of sensing units. The display driving circuit is coupled to the display panel for outputting a plurality of pixel voltages to drive the display panel. The touch sensing circuit is coupled to the touch panel and the display driving circuit for driving the touch panel. The display driving circuit establishes a touch sensing period according to a horizontal synchronization signal and an outputting period of the pixel voltages. The touch sensing circuit provides a plurality of scan signals during the touch sensing period according to the horizontal synchronization signal, so as to obtain electrical variations of the touch panel.

Based on the above, a touch display device and a method for driving the same are provided in the embodiments of the invention. In the method, a display driving circuit periodically reduces an outputting period of pixel voltages so as to establish a touch sensing period, so that a touch sensing circuit performs multiple touch sensing actions in a manner of time sharing with the display driving circuit in each frame period. Therefore, the method not only prevents the obtained touch data from disturbance by the pixel voltages (correspondingly, the pixel voltages are less easily disturbed by a scan signal or a sensing signal) but also prevents the touch sensing data refresh rate from being limited to the FPS, so as to enhance the touch sensibility without affecting the touch sensing accuracy. Furthermore, frames displayed by the display panel becomes smoother.

To make the above features and advantages of the present invention more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the invention.

DESCRIPTION OF EMBODIMENTS

In order to make the invention more comprehensible, embodiments are described below as the examples to show that the invention can actually be realized. Moreover, wherever possible, elements/components/steps with identical reference numerals represent identical or similar parts in the drawings and embodiments.

Figure 1:
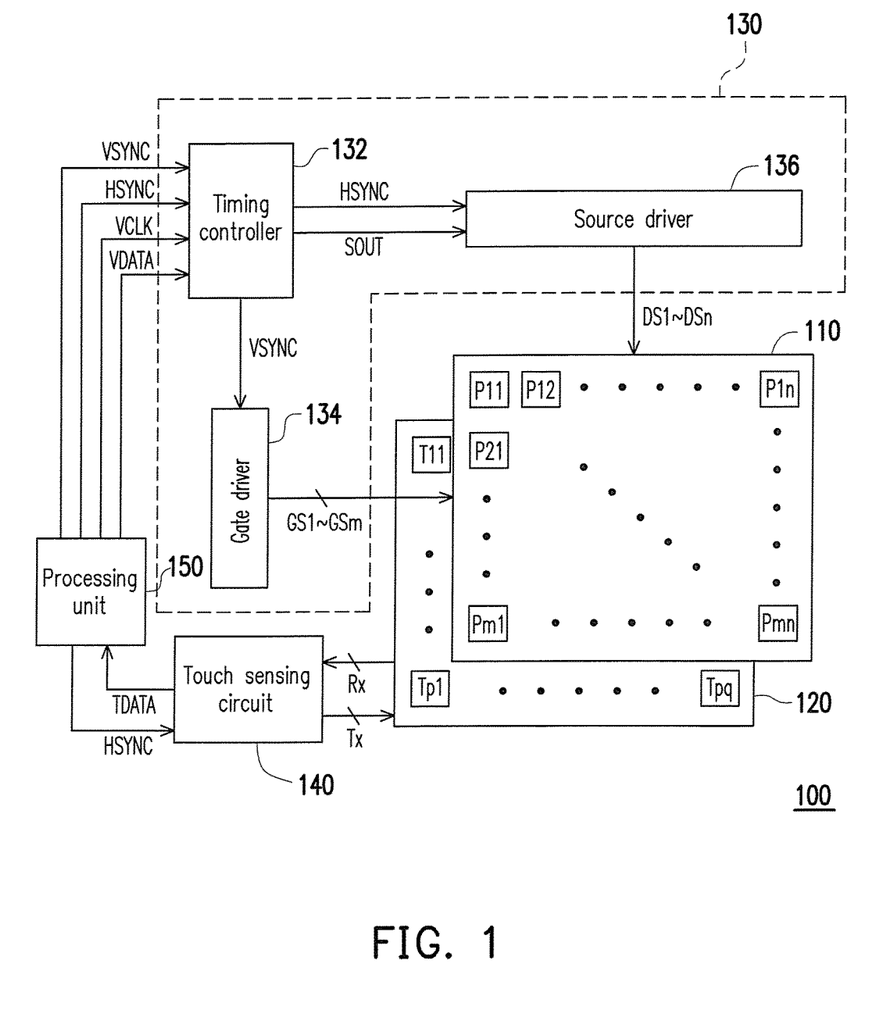
FIG. 1 is a schematic diagram of a touch sensing device according to an embodiment of the invention.

FIG. 1 is a schematic diagram of a touch sensing device according to an embodiment of the invention. Referring to FIG. 1, a touch display device 100 includes a display panel 110, a touch panel 120, a display driving circuit 130 and a touch sensing circuit 140. Herein, the touch display device 100 may be, for example, electronic devices such as a mobile phone or tablet computer having touch functions, but the invention is not limited thereto.

The display panel 110 includes a plurality of pixels P11-Pmn arranged in an array (that is, pixels arranged in a manner of m×n), where m and n are positive integers, and designers may choose the value of m and n according to design needs such as the size of the display panel 110 and the resolution of display. Herein, the display panel 110 is, for example, a liquid crystal display (LCD). The plurality of pixels P11-Pmn are composed respectively of elements such as a TFT switch, a liquid crystal capacitor and a storage capacitor. In addition, although not shown in FIG. 1, the display panel 110 is further provided with a plurality of gate lines and a plurality of data lines. Herein, the pixels P11-P1n, P21-P2n . . . , Pm1-Pmn in each row are coupled to a corresponding gate line respectively, so as to receive a corresponding gate signal GS1-GSm from the display driving circuit 130 via the gate line. In addition, the pixels P11-Pm1, P12-Pm2 . . . , P1n-Pmn in each column are coupled to a corresponding data line respectively, so as to receive corresponding pixel voltages DS1-DSn from the display driving circuit 130 via the data line.

The touch panel 120 may be disposed overlapping with the display panel 110, and the touch panel 120 includes a plurality of sensing units T11-Tpq arranged in an array. The sensing units T11-Tpq respond to pressing/touching actions and have corresponding electric variations, where p and q are positive integers, and designers may choose the value of p and q according to design needs such as the size and the resolution of the touch panel 120. Herein, the touch panel 120 is, for example, a capacitive touch panel 120. Each of the sensing units T11-Tmn is, for example, a touch sensing electrode.

The display driving circuit 130 is coupled to the display panel 110 and is used for driving the display panel 110 according to received image data VDATA, so that the display panel 110 displays a corresponding image. The display driving circuit 130 includes, for example, a timing controller 132, a gate driving 134 and a source driver 136. The timing controller 132 controls an operating sequence of the gate driver 134 and the source driver 136 according to a vertical synchronization signal VSYNC and a horizontal synchronization signal HSYNC, and also provides the image data VDATA to the source driver 136 according to a data clock signal VCLK. Herein, a unit cycle of the vertical synchronization signal VSYNC is approximately the time required for the gate driver 134 to start the first row of pixels P11-P1n to the last row of pixels Pm1-Pmn, which is also equal to a frame period. A unit cycle of the horizontal synchronization signal HSYNC is approximately the time required for enabling the pixels P11-P1n, P21-P2n . . . , or Pm1-Pmn in a row, and is equivalent to the time required for latching the image data VDATA sequentially to each output channel. In other words, the sequence for enabling the rows of pixels P11-P1n, P21-P2n . . . , or Pm1-Pmn in the display panel 110 in each frame period is synchronous with each unit cycle of the horizontal synchronization signal HSYNC (further description in this regard will be provided in subsequent embodiments along with descriptions about the signal sequence.)

The touch sensing circuit 140 is coupled to the touch panel 120 and the display driving circuit 130. The touch sensing circuit 140 sequentially provides a scan signal TX to corresponding sensing units T11-Tpq under a specific driving sequence to drive the touch panel 120, so as to obtain a sensing signal RX for directing the electric variations of the touch panel 120. Take the capacitive touch panel 120 for example, the touch sensing circuit 140 sequentially provides the scan signal TX to each row of sensing units T11-Tpq during the touch sensing period, so that the touch sensing units T11-Tpq responds to the scan signal TX and returns the sensing signal RX relevant to capacitance variations to the touch sensing circuit 140. Based thereon, the touch sensing circuit 140 is able to generate touch data TDATA for directing the coordinate information of a touch point from the sensing signal RX received from the touch panel 120. In addition, the touch sensing circuit 140 in this embodiment obtains the capacitance variations of the touch panel 120 by means of self-capacitance or mutual-capacitance touch sensing, and the invention is not limited thereto.

Furthermore, the touch display device 100 of this embodiment may further include a processing unit 150, which is used for providing the image data VDATA and sequence signals (such as the vertical synchronization signal VSYNC, the horizontal synchronization signal HSYNC and the data clock signal VCLK). The processing unit 150 receives the touch data TDATA from the touch sensing circuit 140 so as to perform subsequent signal processing actions according to the coordinate information of the touch points.

Figure 2:
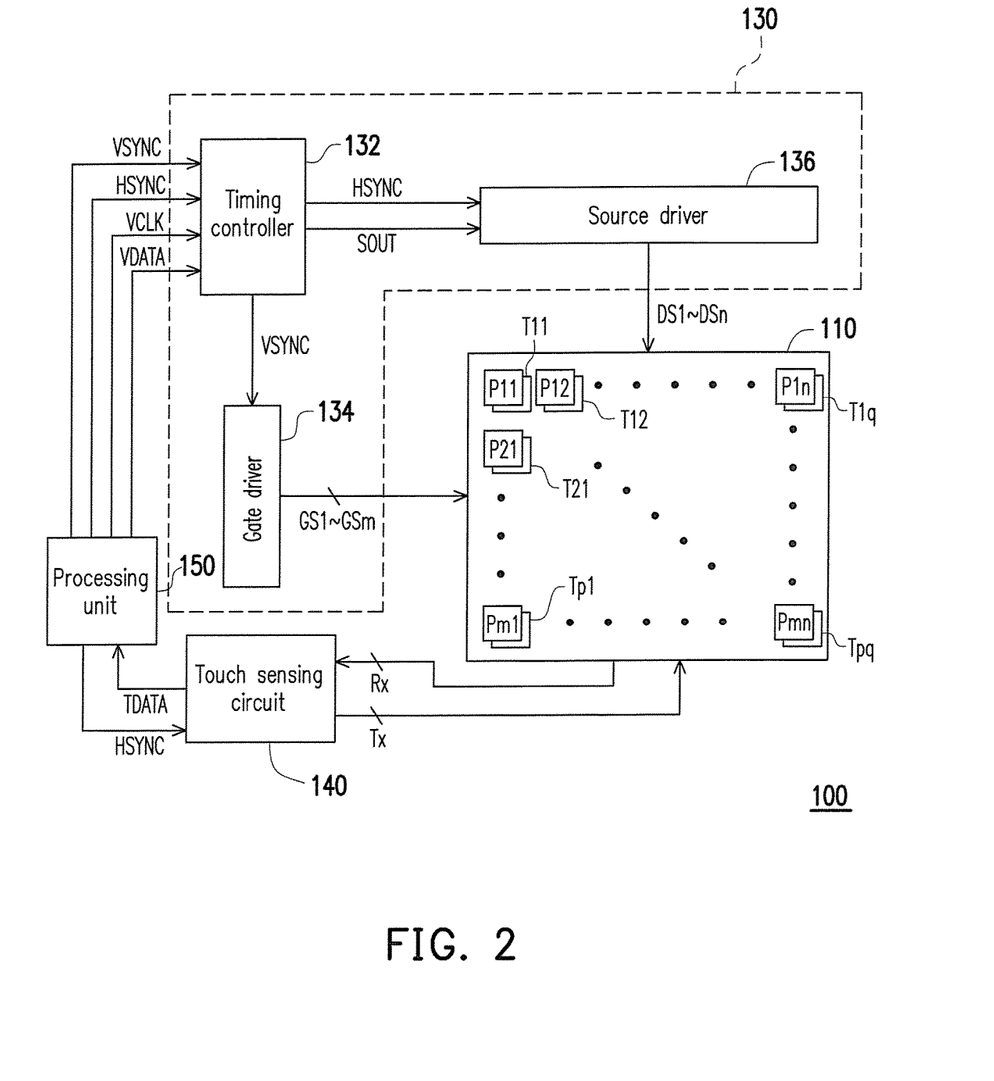
FIG. 2 is a schematic diagram of a touch sensing device according to another embodiment of the invention.

It is worth noting that in actual practice, the display panel 110 and the touch panel 120 may be designed into an on-cell touch display panel or an in-cell touch display panel, that is, the touch sensing units T11-Tpq are disposed on the same substrate as the display panel 110. As shown in FIG. 2, the on-cell/in-cell touch display panel may have a structure as shown in a touch display panel 100'.

More specifically, in the touch display device 100' of FIG. 2, the touch display panel 100' includes pixels P11-Pmn and sensing units T11-Tpq arranged in an array on the same substrate. It should be noted that although FIG. 2 shows that the sensing units T11-Tpq and the pixels P11-Pmn are disposed correspondingly, the invention is actually not limited thereto. That is, designers may design according to two factors, the number of the pixels P11-Pmn and the number of the sensing units T11-Tpq, independently.

In additional to the structure of the touch display panel 100', the circuit arrangement around the touch display device 100' (such as the display driving circuit 130, the touch sensing circuit 140 and the processing unit 150) and the concerns in designs may be sufficiently referred to and inspired by the description about the embodiment of FIG. 1 and are therefore not repeated herein.

Referring to steps and processes in FIG. 3, a method for driving the touch sensing device 100/100' according to embodiments of the invention are provided below. Herein, FIG. 3 is a flowchart of steps of the method for driving the touch sensing device according to an embodiment of the invention.

Figure 3:
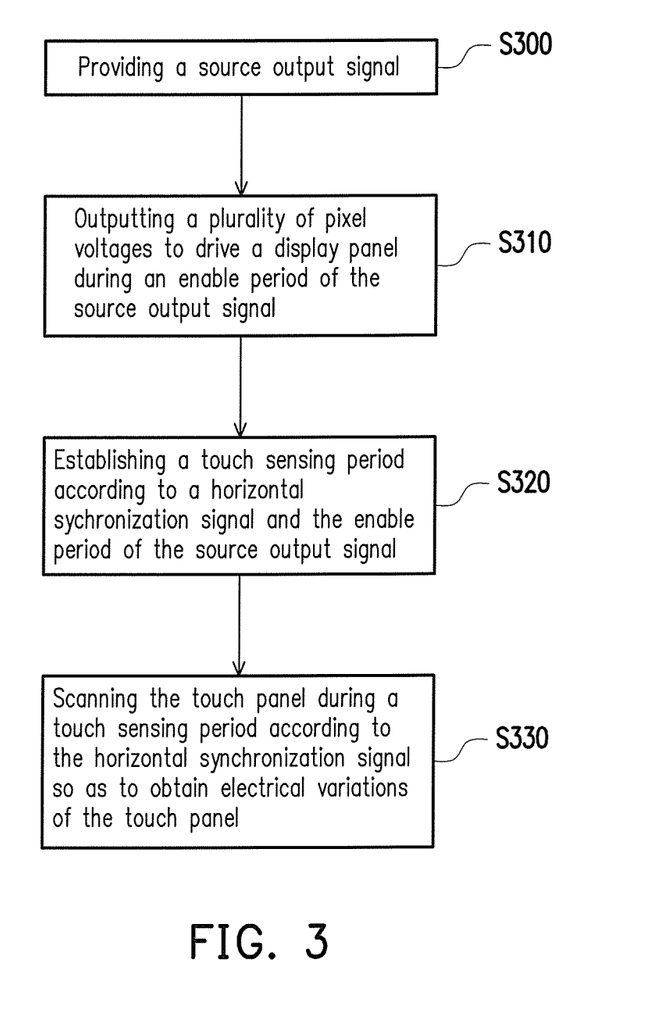
FIG. 3 is a flowchart of steps of a method for driving a touch sensing device according to an embodiment of the invention.

Referring to both FIGS. 1 and 3, in this embodiment, the display driving circuit 130 provides a source output signal SOUT (a step S300) and outputs the pixel voltages DS1-DSn during an enable period of the source output signal SOUT to drive the display panel 110 (a step S310). Then, the display driving circuit 130 establishes/defines a touch sensing period according to the horizontal synchronization signal HSYNC and the enable period of the source output signal SOUT (that is, the display driving circuit 130 periodically reduces the enable period of the source output signal SOUT according to the horizontal synchronization signal HSYNC, so as to establish/define the touch sensing period based on the reduced period) (a step S320). Therefore, the touch sensing circuit 140 scans the touch panel 120 during the touch sensing period according to the horizontal synchronization signal HSYNC, so as to obtain the electrical variations of the touch panel 120 (a step S330).

More specifically, in the steps S300 and S310, the gate driver 134 generates gate signals GS1-GSm according to the vertical synchronization signal VSYNC, so as to use the gate signals GS1-GSm to sequentially start each row of pixels P11-P1n, P21-P2n . . . , Pm1-Pmn on the display panel 110. On the other hand, the source driver 136 of this embodiment may include multi-stage cascade output channels (not shown). The source driver 136 latches the image data VDATA sequentially to the respective output channels according to the horizontal synchronization signal HSYNC. Therein, each output channel in the source driver 136 converts the received image data VDATA into corresponding pixel voltages DS1-DSn, and then outputs the pixel voltages DS1-DSn to corresponding column of pixels P11-Pmn in the display panel 110 according to the source output signal SOUT, so that the display panel 110 displays a image corresponding to the image data VDATA.

In this embodiment, the source output signal SOUT for controlling the respective output channels of the source driver 136 may be generated by the timing controller 132. The timing controller 132 enables the source output signal SOUT coordinated with the enable sequence of the pixels P11-P1n, P21-P2n . . . , Pm1-Pmn in each row. Herein, when the source output signal SOUT is enabled, the pixel voltages DS1-DSn latched to the respective output channels are outputted to corresponding column of pixels P11-Pmn. On the other hand, when the source output signal SOUT is disabled, the respective output channels stop outputting the pixel voltages DS1-DSn. In other words, the enable period of the source output signal SOUT is substantially synchronous with the enable sequence of each row of pixels P11-P1n, P21-P2n . . . , Pm1-Pmn and the enable period of the horizontal synchronization signal HSYNC. Based thereon, the sequence that the source driver 136 outputs the pixel voltages DS1-DSn corresponds to the sequence for enabling each row of pixels P11-P1n, P21-P2n . . . , Pm1-Pmn based on the source output signal SOUT. In real-life practices, the respective stages of output channels may be composed, for example, of shift registers, latch circuits and output buffer circuits. The source output signal SOUT may be, for example, a control latch and/or an enable/disable control signal of an output buffer circuit, but the invention is not limited thereto.

In the step S320, the timing controller 32 periodically reduces the enable period of the source output signal SOUT according to the horizontal synchronization signal HSYNC. In other words, in view of the operation of the source driver 36, the source driver 136 periodically shortens/reduces the output period of the pixel voltages DS1-DSn according to the source output signal SOUT. Herein, the enable period (i.e. the output period that the pixel voltages DS1-DSn are reduced) that the source output signal SOUT is reduced is defined as the touch sensing period.

In the step S330, the sensing circuit 140 obtains the starting timing point and time length of the touch sensing period defined/established in the step S320 according to the horizontal synchronization signal HSYNC, so that the touch sensing circuit 140 provides the scan signal TX sequentially to the corresponding sensing units T11-Tpq to drive the touch panel 120 during the touch sensing period.

Thereby, the touch display device 100 of this embodiment realizes time-division driving of the display panel 110 and the touch panel 120 (that is, the driving sequence of the display panel 110 and the touch panel 120 do not overlap), so as to avoid impact of coupling effects between the display panel 110 and the touch panel 120. More specifically, by means of the method, since the frequency that the touch sensing circuit 140 updates the touch data TDATA is time-division and synchronous with the scan frequency of the display screen, the image shown on the display panel 110 can be more smooth and free of disturbance caused by the scan signal TX or the sensing signal RX; from another perspective, since the provision of the pixel voltages DS1-DSn do not affect the sensing signal RX received by the touch sensing circuit 140, the touch data TDATA generated by the touch sensing circuit 140 is able to reflect touch actions of the user on the touch panel 120 more accurately and faithfully.

Since the output period of the pixel voltages DS1-DSn of the display driving circuit 130 does not overlap with the output period of the scan signal TX of the touch sensing circuit 140, in an exemplary embodiment, the touch sensing circuit 140 may further realize sharing a source line (not shown) with the display driving circuit 130 as a structure for data readout. More specifically, in the exemplary embodiment, the display driving circuit 130 provides the pixel voltages DS1-DSn to each column of pixels P11-Pm1, P21-P2n . . . , Pm1-Pmn on the display panel 110 via the source line on the display panel 110 during the output period of the pixel voltages DS1-DSn. When the driving sequence enters the touch sensing period, the touch sensing circuit 140 receives the sensing signal RX of the electrical variations of the touch panel 120 via the source line. By means of the arrangement of the shared source line, the layout amount of the sensing lines within the display panel 110 is remarkably reduced, so as to enhance the aperture ratio of the display panel 110.

On the other hand, in this embodiment, the interval in each frame period of the touch sensing period may be defined by the designer according to actual needs. The interval may be to establish one corresponding touch sensing period in a unit cycle of every "a" number of horizontal synchronization signals HSYNC, where "a" may be a positive integer equal to or larger than 1 and equal to or smaller than a pulse number of the horizontal synchronization signals HSYNC in one frame period. Based thereon, the touch sensing sensibility of the touch display device 100 may be enhanced. For instance, when "a" equals 1, that means one corresponding touch sensing period is established in a unit cycle of every horizontal synchronization signal HSYNC, and therefore the touch sensing data refresh rate is enhanced. However, when the touch sensing data refresh rate is enhanced, the power consumption of the touch display device also increases. Therefore, when the designer wishes to enhance the touch sensing data refresh rate without too much power consumption, the value of "a" may be set to be a positive integer equal to or larger than 2 and equal to or smaller than the pulse number of the horizontal synchronization signal HSYNC in a frame period. In a preferable embodiment, a corresponding touch sensing period is established in every 1/N frame period, where N is a positive integer larger than 1.

For instance, the designer may design to establish a corresponding touch sensing period in every ¼ frame period (that is, the timing controller 132 reduces the enable period of the source output signal SOUT once in every ¼ frame period.). If the touch sensing circuit 140 performs a complete scan in every touch sensing period, the touch sensing circuit 140 generates a set of touch data TDATA in every ¼ frame period. That is, the touch sensing data refresh rate may be 4 times the FPS. Take actual numbers for example, if the FPS of the display panel 110 is 60 Hz, the data refresh rate of the touch sensing circuit 140 may achieve 240 Hz by means of the method.

In other words, compared with traditional methods for driving touch display devices, since the touch sensing circuit 140 of this embodiment is no longer limited to scanning the touch panel 120 only during blank periods of the display image, the touch sensing data refresh rate is no longer restricted by the FPS of the display.

It should be noted herein that the method in this embodiment of the invention does not limited the sensing actions of the touch sensing circuit 140 during the touch sensing period. In an exemplary embodiment, the touch sensing circuit 140 obtains the sensing signal RX by scanning each row of the sensing units T11-Tpq sequentially during a unit cycle of the touch sensing period. Or, in another exemplary embodiment, the touch sensing circuit 140 first simultaneously scans a portion of the sensing units T11-Tpq, then simultaneously scanning another portion of the sensing units T11-Tpq during a unit cycle of the touch sensing period, so as to obtain the sensing signal RX within a shorter scan period.

For instance, the touch sensing circuit 140 may provide enabling scan signals TX simultaneously to the sensing units T11-T(p/2)q in rows 1 to p/2 during a first period in the touch sensing period, and then provide enabling scan signals TX simultaneously to the sensing units T(p+1)/2-Tpq in rows (p+1)/2 to p during a second period in the touch sensing period, so that it merely takes the touch sensing circuit 140 the time of 2 unit cycles for the scan signal TX to complete the scanning of all the sensing units T11-Tpq. Alternatively, the designer may connect the sensing units T11-T(p/2)q in rows 1to p/2 together and connect the sensing units T(p+1)/2-Tpq in rows (p+1)/2 to p together, so that when the touch sensing circuit 140 outputs the scan signal TX, the sensing units T11-T(p/2)q in rows 1 to p/2 receive the enabling scan signals TX simultaneously, and the sensing units T(p+1)/2-Tpq in rows (p+1)/2 to p receive the enabling scan signals TX simultaneously. Similarly, in this embodiment, it also takes the touch sensing circuit 140 only the time of 2 unit cycles for the scan signals TX to complete the scanning of all the sensing units T11-Tpq. Nevertheless, the invention is not limited thereto.

It should further be noted that the length of the period established for a touch sensing period TP (i.e., the length of the reduced period from the source output signal SOUT) may be adjusted according to the designer's concerns on the premise that such adjustment does not affect normal output of the source driver 136. That is, the length of a first period EP' after the source output signal SOUT is reduced is still sufficient for the respective output channels in the source driver 136 to sequentially perform latching and voltage conversion. In a preferable embodiment, the unreduced first period EP may be, for example, 40 us, and the touch sensing period TP may be, for example, 10 us, while the reduced first period EP' may be, for example, 30 us. Nevertheless, the invention is not limited thereto.

Figure 4:
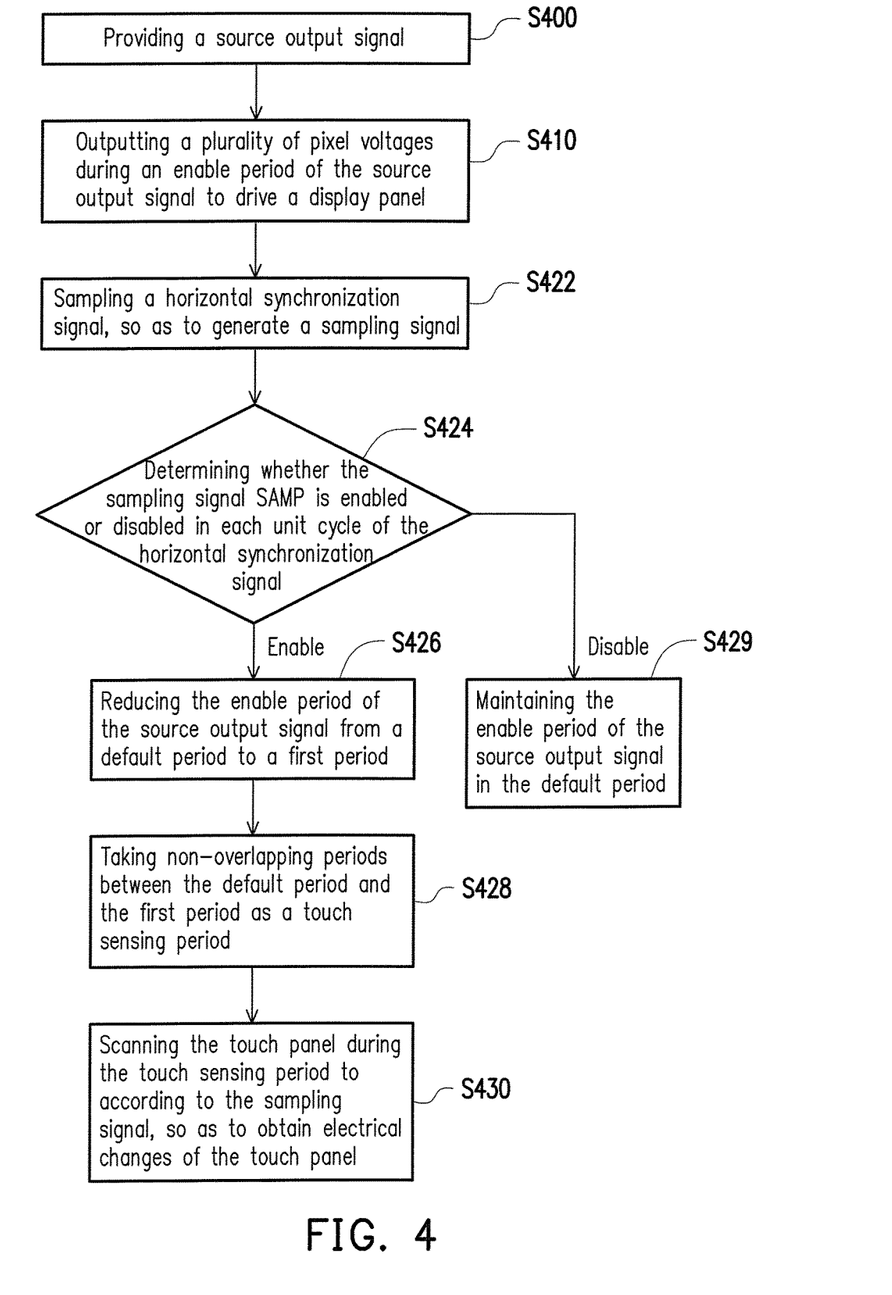
FIG. 4 is a flowchart of steps of a method for driving a touch sensing device according to another embodiment of the invention.
Figure 5:
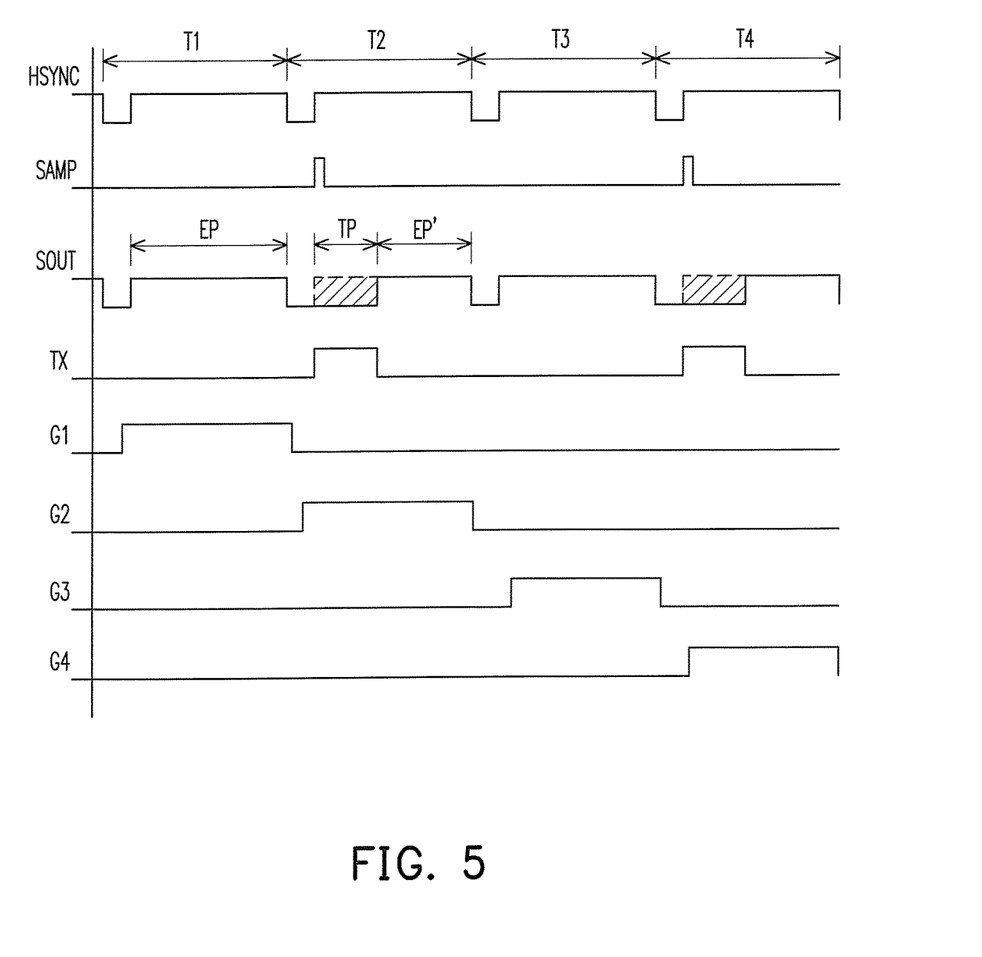
FIG. 5 is a schematic diagram of a signal sequence of a touch sensing device according to an embodiment of the invention.

A specific embodiment of the method for driving the touch display device is described below with reference to FIGS. 4 and 5. Herein, FIG. 4 is a flowchart of steps of a method for driving a touch sensing device according to another embodiment of the invention. FIG. 5 is a schematic diagram of a signal sequence of a touch sensing device according to an embodiment of the invention. In FIG. 5, as an example, it shows the signal sequence of the source output signal SOUT and the scan signal TX when the first to fourth row of pixels P11-P1n, P21-P2n, P31-P3n and P41-P4n are turned-on sequentially (corresponding to 4 unit periods T1-T4 of the horizontal synchronization signal HSYNC). The driving sequence in other periods may be inferred from the descriptions below and will not be repeated again.

Referring to both FIGS. 4 and 5, the display driving circuit 130 first provides a source output signal SOUT (a step S400) and outputs a plurality of pixel voltages DS1-DSn during an enable period of the source output signal SOUT (a step S410). The enable period of the source output signal SOUT refers to a period in which the source out signal SOUT is in high level (such as EP and EP'), but the invention is not limited thereto.

Next, the display driving circuit 130 samples the horizontal synchronization signal HSYNC, so as to generate a sampling signal SAMP (a step S422). Example is taken herein that the sample is taken in every two unit cycles of the horizontal synchronization signal HSYNC. Therefore, in this embodiment, the sampling signal SAMP generated by the display driving circuit 130 is enabled respectively in unit cycles T2 and T4 and disabled in unit cycles T1 and T3, but the invention is not limited thereto.

After the sampling signal SAMP is generated, the display driving circuit 130 determines whether the sampling signal SAMP is enabled or disabled in each unit cycle (such as T1-T4) of the horizontal synchronization signal HSYNC (a step S424). When the display driving circuit 130 determines that the sampling signal SAMP in one of the plurality of unit cycles (such as unit cycles T2 and T4) is enabled, the display driving circuit 130 reduces the enable period of the source output signal SOUT in the one unit cycle from a default period EP to a first period EP' (a step S426). Therefore, according to the sampling signal SAMP, the touch sensing circuit 140 takes non-overlapping periods (i.e. slant line areas) between the default period EP and the first period EP' as a touch sensing period TP (a step S428), and scan signals TX are sent during this touch sensing period TP to scan the touch panel 120, so as to obtain electrical variations on the touch panel 120 (a step S430).

In contrast, when the display driving circuit 130 determines that the sampling signal SAMP is disabled in one of the plurality of unit cycles (such as unit cycles T1 and T3), the display driving circuit 130 maintains the enable period of the source output signal SOUT in the one unit cycle as the default period EP (a step S429). Therefore, according to the sampling signal SAMP, the touch sensing circuit 140 determines at this point not to perform scanning of the touch panel 120 in this unit cycle.

Further described chronically, in the unit cycle T1 of the horizontal synchronization signal HSYNC, the display driving circuit 130 generates a disable sampling signal SAMP. Therefore, the display driving circuit 130 maintains the enable period of the source output signal SOUT as the default period EP according to the disable sampling signal SAMP. In other words, in the unit cycle T1 of the horizontal synchronization signal HSYNC, when the gate signal G1 used for driving the first row of pixels P11-P1n is enabled, the display driving circuit 130 simultaneously enables the source output signal SOUT, so as to output pixel voltages DS1-DSn to the first row of pixels P11-P1n during the default period EP.

Next, when the unit cycle T1 ends and the timing-sequence subsequently enters the second unit cycle T2, the display driving circuit 130 generates an enable sampling signal SAMP. At this point, the display driving circuit 130 reduces the enable period of the source output signal SOUT from the default period EP to the first period EP' according to the enable sampling signal SAMP, so as to establish the touch sensing period TP. Meanwhile, the touch sensing circuit 140 sends the scan signal TX to scan the touch panel 120 during the touch sensing period TP according to the enable sampling period SAMP. After the touch sensing period TP ends, the touch sensing circuit 140 stops sending the scan signal TX, and the display driving circuit 130 subsequently outputs the pixel voltages DS1-DSn to the display panel 110 according to the enable source output signal SOUT during the first period EP'.

In other words, in the unit cycle T2 of the horizontal synchronization signal HSYNC, when a gate signal G2 used for driving the second row of pixels P21-P2n is enabled, the touch sensing circuit 140 scans the touch panel 120 during a portion of a turned-on period (i.e. the touch sensing period TP) of the second row of pixels P21-P2n (at this point, the display driving circuit 130 suspends the output of the pixel voltages DS1-DSn). The display driving circuit 130 outputs the pixel voltages DS1-DSn to drive the driving display panel 110 during the rest of the turned-on period (i.e. the first period EP') of the second row of pixels P21-P2n.

It should be noted here that although the example in FIG. 4 is taken that the signal sequence indicates that the touch display device 100 first enters the touch sensing period TP and subsequently into the first period EP', the invention is not limited thereto. In other embodiments, the touch display device 100 may also enter the first period EP' first and then into the touch sensing period TP, that is, the display driving circuit 130 may first output the pixel voltages DS1-DSn in the unit cycle T2, and then the touch sensing circuit 140 performs scanning of the touch panel 120.

Since this embodiment takes for example that a sampling is taken in every two unit cycle of the horizontal synchronization signal HSYNC (but without being limited thereto), the signal sequence in unit cycles T3 and T4 are respectively identical with the signal sequence in unit cycles T1 and T2, which is thus not repeated herein.

It is further worth mentioning that the method in the embodiments of the invention is not limited merely to realizing reduction in the enable period of the source output signal SOUT/output period of the pixel voltages DS1-DSn by generating the sampling signal SAMP and thereby establishing the touch sensing period TP. In another embodiment, the display driving circuit 130 and the touch sensing circuit 140 may establish the touch sensing period TP by counting the number of pulses of the horizontal synchronization signal HSYNC.

For instance, the display driving circuit 130 and the touch sensing circuit 140 may perform the actions of reducing the enable period of the source output signal SOUT and scanning the touch panel 120 once every time when 2 pulses of the horizontal synchronization signal HSYNC are counted. By means of this method, the touch display device 100 is similarly able to realize the driving sequence as shown in FIG. 4. More specifically, as long as the driving circuit 130 periodically reduces the enable period of the source output signal SOUT/output period of the pixel voltages DS1-DSn so that the touch sensing circuit 140 is able to use the reduced period for touch sensing, the technique falls into the scope that the invention claims.

In view of the above, a touch display device and a method for driving the same are provided in the embodiments of the invention. In the method, the display driving circuit periodically reduces the outputting period of the pixel voltages so as to establish a touch sensing period, so that the touch sensing circuit performs multiple touch sensing actions in a manner of time sharing with the display driving circuit in each frame period. Therefore, the method not only prevents the obtained touch data from disturbance by the pixel voltages (correspondingly, the pixel voltages are less easily disturbed by the scan signal or the sensing signal) but also prevents the touch sensing data refresh rate from being limited to the FPS, so as to enhance the touch sensibility without affecting the touch sensing accuracy. Furthermore, images displayed by the display panel becomes smoother.

Finally, it should be noted that the embodiments are used for describing technical solutions of the invention without limiting the invention. Although detailed descriptions of the invention are provided with reference to the embodiments, persons skilled in the art should realize that the technical solutions recited in the embodiments may still be modified, or a portion or all of the technical features may be substituted by equivalents, provided that such modifications or substitutions do not lead the spirit of corresponding technical solutions to depart from the scope of the technical solutions in the embodiments of the invention.

What is claimed is:

1. A method for driving a touch display device, wherein the touch display device comprises a plurality of pixels and a plurality of sensing units, the method comprising:
    providing a source output signal;
    outputting a plurality of pixel voltages during an enable period of the source output signal to drive the pixels of the touch display device;
    periodically reducing the enable period of the source output signal so as to establish a touch sensing period; and
    providing a plurality of scan signals to the sensing units of the touch display device during the touch sensing period, so as to obtain a plurality of sensing signals relevant to electrical variations of the touch display device,
    wherein the enable period of the source output signal is reduced to establish the touch sensing period within one unit cycle of a horizontal synchronization signal.

2. The method for driving the touch display device according to claim 1, wherein the step of periodically reducing the enable period of the source output signal so as to establish the touch sensing period comprises:
    sampling the horizontal synchronization signal so as to generate a sampling signal; and
    determining whether to reduce the enable period of the source output signal in a unit cycle of the corresponding horizontal synchronization signal according to the sampling signal.

3. The method for driving the touch display device according to claim 2, wherein the step of determining whether to reduce the enable period of the source output signal in the unit cycle of the corresponding horizontal synchronization signal according to the sampling signal comprises:
    determining whether the sampling signal is enabled or disabled in each unit cycle of the horizontal synchronization signal;

maintaining the enable period of the source output signal as a default period when the sampling signal in the one unit cycle is disabled; and setting the enable period of the source output signal in one of the unit cycles as a first period when the sampling signal in the one unit cycle is enabled;

wherein the first period is smaller than the default period.

4. The method for driving the touch display device according to claim 3, wherein in the unit cycle that the sampling signal is enabled, a period of the default period minus the first period is taken as the touch sensing period, and the touch sensing period does not overlap with the first period.

5. The method for driving the touch display device according to claim 4, wherein in the unit cycle that the sampling signal is enabled, the touch display device first enters the touch sensing period and then enters the first period.

6. The method for driving the touch display device according to claim 4, wherein in the unit cycle that the sampling signal is enabled, the touch display device first enters the first period and then enters the touch sensing period.

7. The method for driving the touch display device according to claim 1, wherein the step of periodically reducing the enable period of the source output signal so as to establish the touch sensing period comprises:

determining whether to reduce the enable period of the source output signal in a unit cycle of the corresponding horizontal synchronization signal according to a number of pulses of the horizontal synchronization signal.

8. The method for driving the touch display device according to claim 7, wherein the step of determining whether to reduce the enable period of the source output signal in the unit cycle of the corresponding horizontal synchronization signal according to the number of pulses of the horizontal synchronization signal comprises:

when the number of pulses of the horizontal synchronization signal does not reach a default value, maintaining the enable period of the source output signal, in a unit cycle of the horizontal synchronization signal that does not reach the default value, as the default period; and when the number of pulses of the horizontal synchronization signal reaches the default value, setting the enable period of the source output signal, in the unit cycle of the horizontal synchronization signal that reaches the default value, as the first period, wherein the first period is smaller than the default period.

9. The method for driving the touch display device according to claim 8, wherein in the unit cycle of the horizontal synchronization signal that reaches the default value, a period of the default period minus the first period is taken as the touch sensing period, and the touch sensing period does not overlap with the first period.

10. The method for driving the touch display device according to claim 9, wherein in the unit cycle of the horizontal synchronization signal that reaches the default value, the touch display device first enters the touch sensing period and then enters the first period.

11. The method for driving the touch display device according to claim 9, wherein in the unit cycle of the horizontal synchronization signal that reaches the default value, the touch display device first enters the first period and then enters the touch sensing period.

12. The method for driving the touch display device according to claim 1, wherein in a frame period, one corresponding touch sensing period is established in a unit cycle of every "a" number of horizontal synchronization signals, wherein a value of "a" is a positive integer equal to or larger than 1 and equal to or smaller than a pulse number of the horizontal synchronization signals in a frame period.

13. The method for driving the touch display device according to claim 12, wherein a corresponding touch sensing period is established in every 1/N frame period, wherein a value of "N" is a positive integer larger than 1.

14. The method for driving the touch display device according to claim 1, wherein the step of providing the plurality of scan signals to the plurality of sensing units of the touch display device during the touch sensing period, so as to obtain electrical variations of the touch display device comprises:

sequentially scanning each row of the sensing units during the touch sensing period.

15. The method for driving the touch display device according to claim 1, wherein the step of providing the plurality of scan signals to the plurality of sensing units of the touch display device during the touch sensing period, so as to obtain electrical variations of the touch display device comprises:

simultaneously scanning a portion of the sensing units during a first period of the touch sensing period;

simultaneously scanning another portion of the sensing units during a second period of the touch sensing period.

16. A touch display device, comprising:

a touch display panel, comprising a plurality of pixels and a plurality of sensing units arranged in an array;

a display driving circuit, coupled to the touch display panel to provide a source output signal and output a plurality of pixel voltages to drive the pixels during an enable period of the source output signal; and a touch sensing circuit, coupled to the touch display panel for driving the plurality of sensing units, wherein the display driving circuit periodically reduces the enable period of the source output signal so as to establish a touch sensing period, wherein the touch sensing circuit provides a plurality of scan signals during the touch sensing period, so as to obtain a plurality of sensing signals relevant to electrical variations of the sensing units, wherein the enable period of the source output signal is reduced to establish the touch sensing period within one unit cycle of a horizontal synchronization signal.

17. The touch display device according to claim 16, wherein the display driving circuit samples the horizontal synchronization signal so as to generate a sampling signal and determines whether the sampling signal is enabled or disabled in each unit cycle of the horizontal synchronization signal;

when the sampling signal in one of the unit cycles is disabled, the display driving circuit maintains an output period of the pixel voltages in the one unit cycle as the default period; and when the sampling signal in one of the unit cycles is enabled, the display driving circuit sets an output period of the pixel voltages in the one unit cycle as a first period, wherein the first period is smaller than the default period.

18. The touch display device according to claim 16, wherein the touch display panel comprises multiple source lines coupled to each column of pixels, the display driving circuit provides the pixel voltages to the pixels via the sources lines during the enable period of the source output signal, and the touch sensing circuit receives the sensing signals indicating the electrical variations of the sensing units via the source lines during the touch sensing period.

19. A touch display device, comprising:
   a display panel, comprising a plurality of pixels arranged in an array;
   a touch panel, comprising a plurality of sensing units;
   a display driving circuit, coupled to the display panel to provide a source output signal and output a plurality of pixel voltages to drive the pixels during an enable period of the source output signal; and
   a touch sensing circuit, coupled to the touch panel for driving the sensing units,
   wherein the display driving circuit periodically reduces the enable period of the source output signal so as to establish the touch sensing period;
   wherein the touch sensing circuit provides a plurality of scan signals during the touch sensing period, so as to obtain a plurality of sensing signals relevant to electrical variations of the sensing units,
   wherein the enable period of the source output signal is reduced to establish the touch sensing period within one unit cycle of a horizontal synchronization signal.

20. The touch display device according to claim 19, wherein the display driving circuit samples the horizontal synchronization signal so as to generate a sampling signal and determines whether the sampling signal is enabled or disabled in each unit cycle of the horizontal synchronization signal;
   when the sampling signal in one of the unit cycles is disabled, the display driving circuit maintains an output period of the pixel voltages in the one unit cycle as a default period; and
   when the sampling signal in one of the unit cycles is enabled, the display driving circuit sets an output period of the pixel voltages in the one unit cycle as a first period,
   wherein the first period is smaller than the default period.

* * * * *